July 14, 1964   F. C. I. MARCHANT ETAL   3,140,841
CONTROLS FOR VERTICAL TAKE-OFF AIRCRAFT
Filed Sept. 10, 1962   5 Sheets-Sheet 1

Inventors
Francis Charles Ivor Marchant
Robert William Jaggard
By
Bailey, Stephens + Huettig
Attorneys Inventors
Francis Charles Ivor Marchant
Robert William Jaggard
By
Bailey, Stephens & Huettig
Attorneys Inventors
Francis Charles Ivor Marchant
Robert William Jaggard
By
Bailey, Stephens, & Huettig
Attorneys

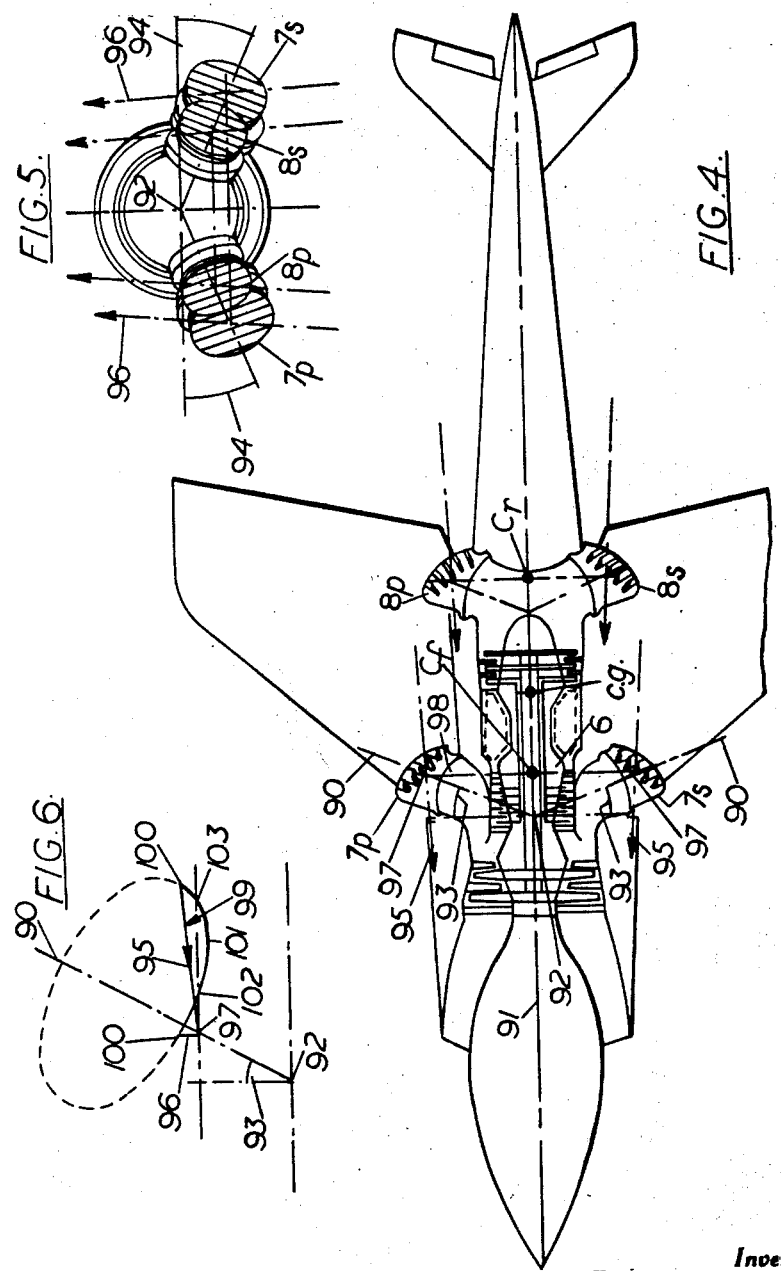

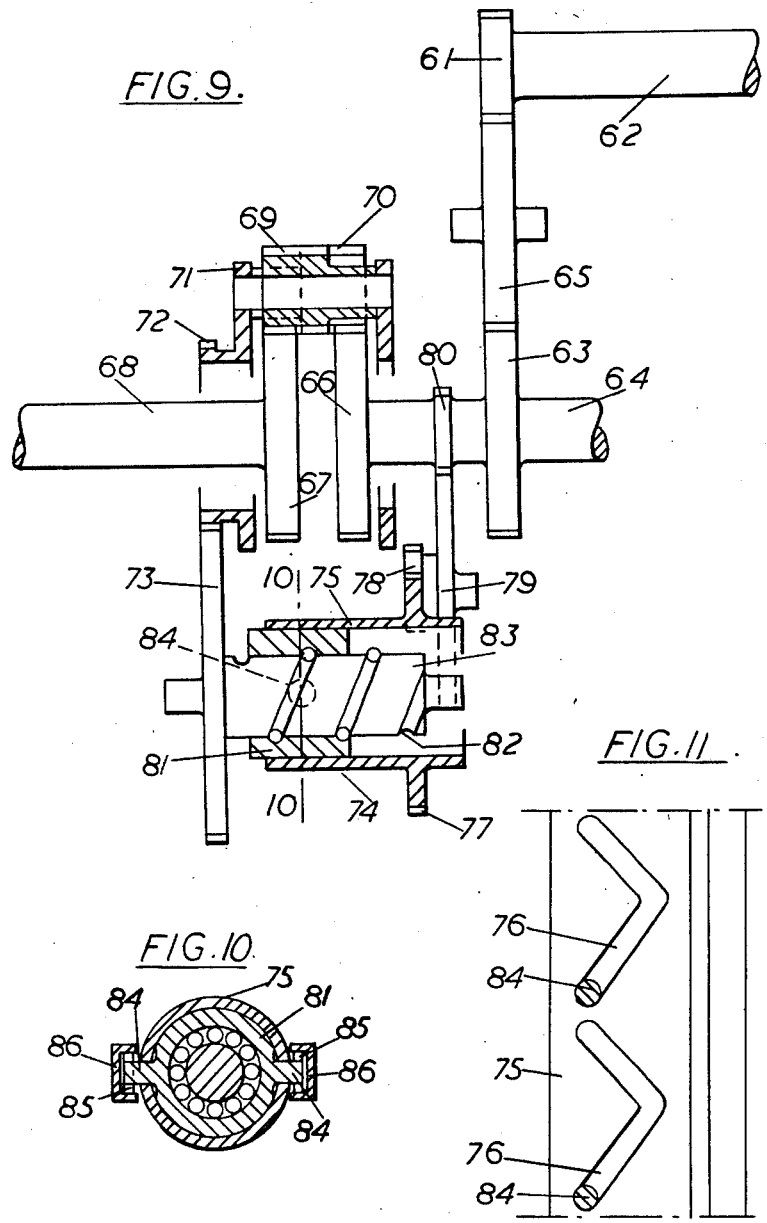

United States Patent Office 3,140,841
Patented July 14, 1964

3,140,841
CONTROLS FOR VERTICAL TAKE-OFF
AIRCRAFT
Francis Charles Ivor Marchant and Robert William Jaggard, Bristol, England, assignors to Bristol Siddeley Engines Limited, Bristol, England, a British company
Filed Sept. 10, 1962, Ser. No. 222,398
Claims priority, application Great Britain Sept. 14, 1961
9 Claims. (Cl. 244—23)

This invention relates to aircraft having a forward jet nozzle system and an aft jet nozzle system each adjustable to vary the orientation of its thrust vector in a vertical fore-and-aft principal plane through the centre of gravity of the aircraft. Throughout this specification directional terms, such as "horizontal," "forwards," "higher," are used with reference to an aircraft when in the attitude for horizontal flight.

In such an aircraft, if the nozzle systems are arranged so that the thrust vector of the forward system turns about an orientation centre forward of the centre of gravity of the aircraft, and the thrust vector of the rear system turns about an orientation centre rearward of the centre of gravity, then vertical take-off and landing without angular pitching movement can be achieved with both vectors directed vertically upward and producing equal and opposite moments about the centre of gravity of the aircraft. If the orientation centres lie on a straight line passing through the centre of gravity, transition to horizontal flight can be achieved, without introducing a pitching moment on the aircraft, simply by orientating the vectors equally in unison into a forward direction. Cases arise however in which it is desired to have the orientation centres of the thrust vectors, or at least of the front vector, below the centre of gravity of the aircraft, and it is then necessary to introduce corrective measures to prevent the development of large pitching moments during transition from vertical or hovering flight to horizontal flight and vice versa.

According to the present invention, the orientation centre of the forward system is forward of and lower than the centre of gravity of the aircraft, and the orientation centre of the rear system is rearward of and not higher than the centre of gravity, and the aircraft has control means, including a control member, arranged to adjust the nozzle systems to vary the orientations of the thrust vectors in a sequence in which, in an initial position of the control member, both thrust vectors are orientated substantially vertically upwards, on movement of the control member from the initial position through a first range the front vector is turned forwards until its moment about the centre of gravity is a maximum, the rear vector not being orientated forwards of the vertical during any part of this first range, and on movement of the control member through a subsequent range both vectors are turned forwards simultaneously until the front vector is horizontal or nearly so.

Each jet thrust nozzle system may comprise one or more nozzles, and the term "thrust vector" includes the resultant thrust vector of a system comprising more than one nozzle.

The invention is illustrated by the accompanying drawings, in which:

FIGURES 4 and 5 are a view from beneath another aircraft, and a rear elevation of its engine respectively;

FIGURE 6 is an explanatory diagram;

FIGURE 9 illustrates a nozzle adjusting mechanism incorporating differential gearing for varying the angular relationship;

FIGURE 10 is a section taken at the line 10—10 in FIGURE 9; and

FIGURE 11 is a developed view of a cam sleeve forming part of the mechanism of FIGURE 9.

Figure 1:
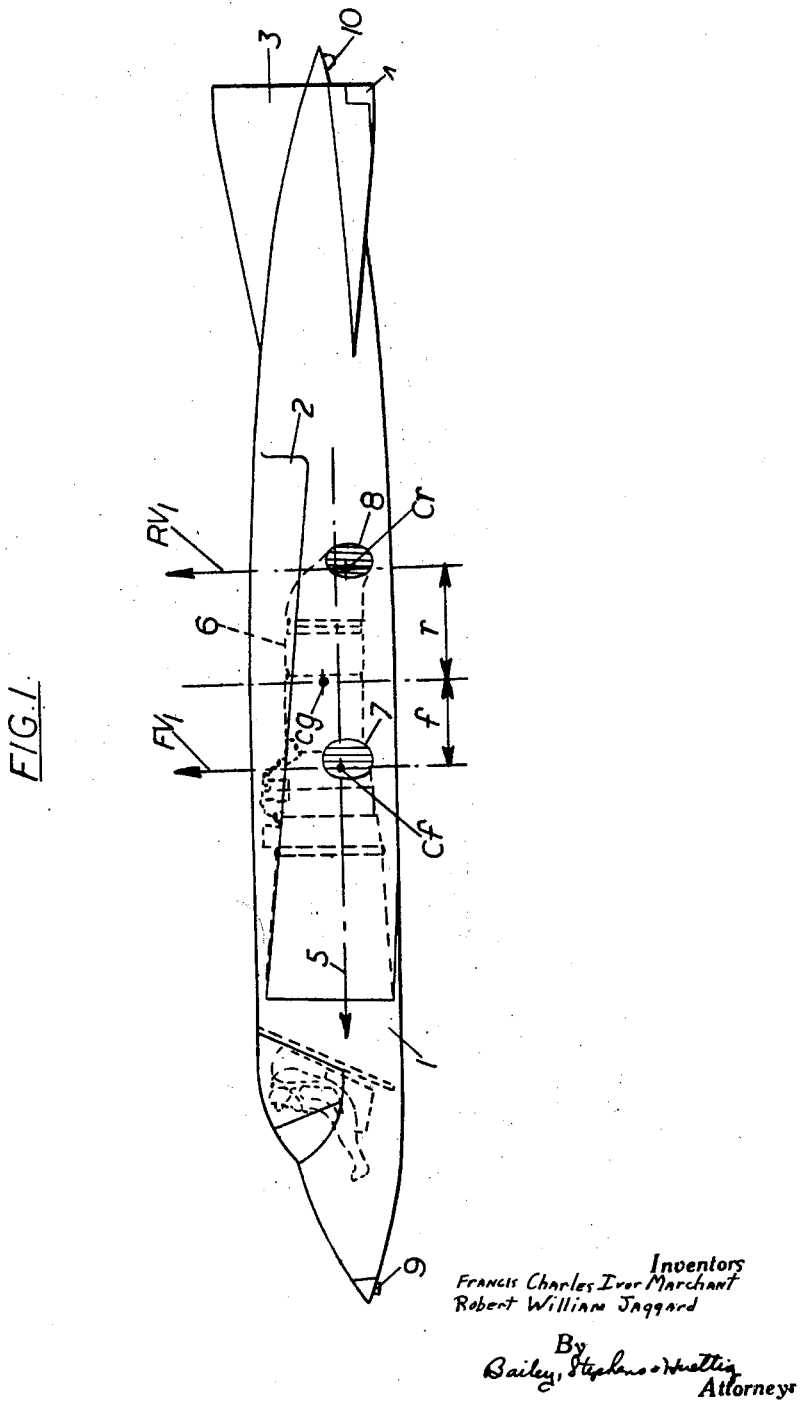
FIGURE 1 is a side view of a winged aircraft to which the invention may be applied.

The aircraft shown in FIGURE 1 comprises a body 1, wings 2 and tail 3 provided with elevator control surfaces 4. The aircraft is designed for vertical take off and for forward flight in the direction of the arrow 5. The attitude of the aircraft in the pitching plane, relatively to the arrow 5, may vary to some extent with speed during horizontal forward flight, but we are concerned here with the attitude at low forward speeds not mucht above the stalling condition of the wings in the absence of jet lift. The aircraft has a power plant comprising a ducted fan or by-pass type of gas turbine engine 6 supplying compressed air to a pair of swivelling jet thurst nozzles 7 arranged one on each side of the aircraft in front of its centre of gravity, indicated by the reference $cg$, and exhaust gas to another pair of swivelling jet thrust nozzles 8 arranged behind $cg$. The nozzles of each pair are similar in respect of size and configuration and are adjusted in unison so that their resultant thrust vector lies in a plane which passes through $cg$ and which, when the aircraft is in its horizontal flight attitude, is vertical and aligned with the flight direction 5. In FIGURE 1 this plane is therefore parallel to the paper. The nozzles may, for example, be elbow nozzles having a deflection angle of 90°, the nozzles of each pair being symmetrically arranged on opposite sides of the vertical fore and aft plane and swivelling about an axis perpendicular to that plane, so that their resultant thrust vector lies in the plane and remains constant in magnitude so long as the individual nozzle thrusts remain unaltered.

The front and rear thrust vectors will be denoted by the references FV and RV respectively and are shown by the arrows $FV_1$ and $RV_1$ in FIGURE 1 in their initial vertical positions for take-off. The ratio of the thrusts of the front and rear nozzles is, in this example, 4:3 and it therefore follows that the nozzles should be situated so that the horizontal distances $f$ and $r$ of their vectors, when vertical, from $cg$ are in the inverse ratio 3:4. The nozzles are furthermore arranged so that the centres of rotation $Cf$ and $Cr$ of their vectors FV and RV respectively are below $cg$. It will be seen that if FV and RV are orientated forward in unison, the lever arm of the front vector about $cg$ will increase while that of the rear vector will decrease. Consequently there will be a nose-up pitching moment, the strength of which will depend upon the spacing of $cg$ from a line passing through the orientation centres $Cf$ and $Cr$.

The aircraft is provided with small attitude control nozzles 9 and 10 at its front and rear ends, to which compressed air bled from the engine is supplied as necessary, but it is desirable to relieve this system wholly or partly of the duty of balancing out the nose-up pitching moment referred to above.

Figure 2:
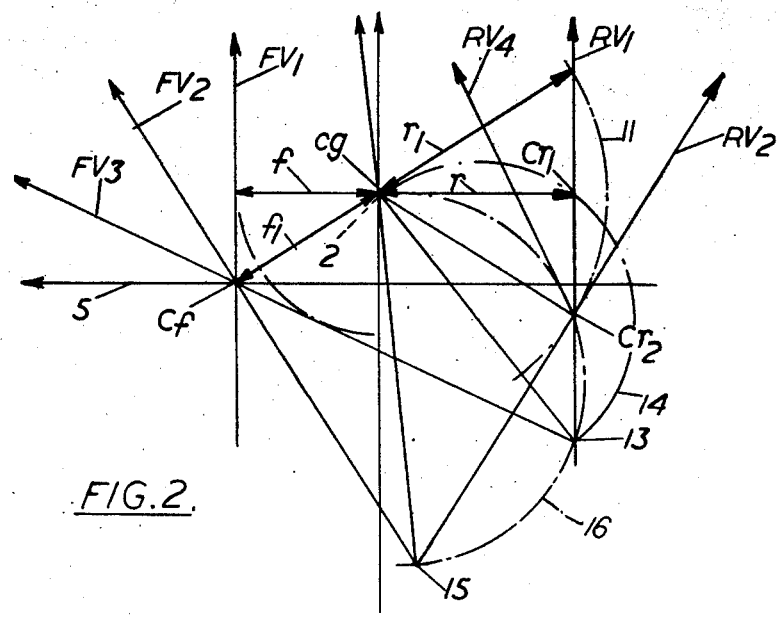
FIGURES 2 and 2A are explanatory vector diagrams.

Referring now to FIGURE 2, the $cg$, the orientation centres $Cf$ and $Cr$, and the vertical positions $FV_1$ and $RV_1$ of the front and rear thrust vectors, are shown with the same reference letters, and 5 again indicates the direction of horizontal flight. Considering first the effect of forwardly orientating the front vector FV, it will be seen that its lever arm about $cg$, which in the initial position is $f$, increases until a maximum value $f_1$ equal to the distance from $Cf$ to $cg$ is reached, with FV at $FV_2$ at right angles to $f_1$, and then decreases again to its initial value with FV at $FV_3$ tangent to an arc of radius $f$.

If $Cr$ is located at point $CR_1$ horizontally opposite $cg$, any direction of orientation of RV will decrease its lever arm, and the least introduction of nose-up pitching moment will be obtained by leaving RV in its vertical position $RV_1$ until FV has been orientated to its position $FV_3$, in which its moment is again equal and opposite to the moment of $RV_1$. $FV_3$ then intersects $RV_1$ at 13, and the resultant thrust on the aircraft is in the direction of the line 13–$cg$. If both vectors are now orientated forwards in suitable phased relation, their moments about $cg$ will remain equal and opposite.

Figure 2A:
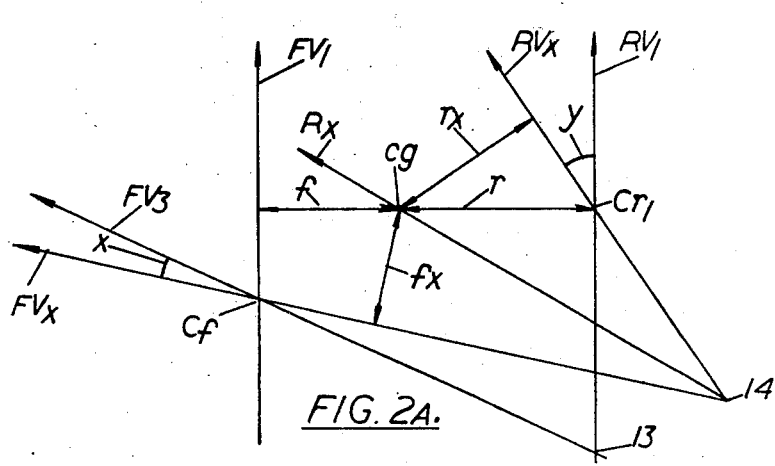

The determination of this phased relation is illustrated in FIGURE 2A, which includes a repeat of the relevant parts only of FIGURE 2 in order to avoid confusion. After further turning of FV through an angle $x$ from $FV_3$ to $FV_x$ its lever arm from $cg$ is $f_x$. To avoid introduction of a pitching moment on the aircraft, the lever arm of RV must be $$r_x = f_x \cdot \frac{r}{f}$$

which gives the required angle $y$ through which RV must be turned forwardly from $RV_1$ to reach $RV_x$. The resultant thrust $R_x$ of both nozzle systems then passes through $cg$ and the intersction 14 of $FV_x$ and $RV_x$.

By the time the front vector has reached alignment with the forward flight direction, arrow 5, sufficient forward speed will have been attained for the wings 2 and the elevator control surfaces 4 to have become capable of supporting the aircraft and of countering any pitching moments produced by the vectors. Consequently it is preferred at this stage to hold the front vector stationary while continuing turning of the rear vector into parallelism with it. In principle, however, orientation of both vectors can proceed in unison until their resultant lies in the direction of flight. Movement of the front vector, which will have a downward inclination, is then reversed until both vectors are finally aligned with the flight direction. Yet another possibility is to turn RV somewhat faster than FV starting from $RV_1$ and $FV_3$, so that FV and RV attain substantially horizontal orientation simultaneously.

With a winged aircraft it may be found that maximum spaced in horizontal flight is obtained with a small upward inclination of one or both of the thrust vectors from the direction of flight, and in that case the final position of the vectors may be the one giving that result.

The invention is also applicable to wingless aircraft, but in that case the nozzle adjusting means need not be arranged to orientate the rear vector forwards of its position at the end of the second range of the control member.

The nozzle adjusting means may also include a trimming system whereby, at least when the control member of the nozzle adjusting means is in its initial position, both vectors may be orientated in unison at equal rates so as to vary the initial vector positions in relation to the aircraft, and therefore the attitude of the aircraft during vertical flight.

The nose-up moment occurring in the first phase, until FV reaches $FV_3$ can be counterbalanced by discharging air downwards through the rear attitude control nozzle 10, or by burning additional fuel in the exhaust gags supplied to the nozzles 8 so as to increase their thrust. Conversely, if fuel is being burnt in the air supplied to the forward nozzles 7, their thrust may be suitably decreased by reducing the amount of fuel so burnt. Instead of holding RV in its vertical position until FV has reached its rebalance position $FV_3$, one can proceed on the basis that as a correction moment has had to be established to deal with the situation when FV is at $FV_2$ this moment may as well be kept in operation while transition to forward flight is being completed. In this case therefore, forward turning of RV begins when FV reaches position $FV_2$.

To permit full compensation by orientation of the rear vector RV, its orientation centre $Cr$ must be placed in a position which permits its lever arm, which in the initial position is $r$, to be increased to a value $r_1$ equal to $f_1$ multiplied by $FV/RV$. In other words, $Cr$ must be on or outside an arc 11 centred at $cg$ and of radius $r_1$.

If $Cr$ is located at $Cr_2$, where the arc 11 intersects $RV_1$ below the horizontal line 5, it becomes possible, while turning FV from $FV_1$ to its maximum moment position $FV_2$, to counterbalance exactly the increased moment by turning RV in the opposite direction to $RV_2$, where it is tangent to the arc 11 of radius $r_1$. $FV_2$ and $RV_2$ intersect at point 15, so their resultant lies in the direction 15–$cg$ and, in this example, is inclined forwardly at a small angle. There is at this stage some loss of lifting efficiency owing to the vectors not being vertical. This loss, which need only be of short duration, may be countered by increasing the engine power to increase both vectors proportionately, or may be allowed to cause a reduction in upward acceleration of the aircraft. If both vectors are now turned forwards at equal angular speeds, their point of intersection 15 moves round an arc 16 of a circle which passes through $Cf$, $cg$ and $Cr_2$ and their moments about $cg$ remain equal and opposite. The acquisition of forward speed by the aircraft may result in the development of aerodynamically produced pitching moments, to counter which the vector orientation rates may be made slightly unequal in the required sense. As in the previous case, it is preferred to continue this turning in unison until FV is aligned with the flight direction 5 and RV is in the position $RV_4$, and then to continue turning RV alone until it is also aligned with the flight direction.

If $Cr$ is located at a position lower than $Cr_2$, full moment compensation will be possible with a smaller rearward turning of RV, and therefore more efficiently, since any rearward inclination not only results in a loss of lift but also in obstruction to acceleration in the forward direction. This advantage is, however, offset by the fact that an increase nose-up moment is produced when RV is directed fowards for forward flight.

If $Cr$ is located between positions $Cr_1$ and $Cr_2$, partial compensation for the increasing nose-up moment of FV can be obtained by initial rearward turning of RV. This compensation can be arranged to be exact until a position of FV short of $FV_2$ is reached, depending on the location of $Cr$, after which an increasing error would arise while RV was held stationary at right angles to the line joining $Cr$ to $cg$. This error would decrease upon FV passing $FV_2$ and again become zero at a position of FV short of $FV_3$. Both vectors may be turned forwards in unison either from the maximum error position or from the subsequent zero error position. Alternatively it could be arranged that the error rises progressively to a maximum as FV is turned from $FV_1$ to $FV_2$, and is then either maintained constant while both vectors are turned forwards, or is allowed to fall progressively to zero as FV is turned from $FV_2$ to $FV_3$, before RV is turned forwards of position $RV_1$.

In all these cases, RV is not turned forwards of its vertical position $RV_1$ until FV has at least reached the position $FV_2$ in which its moment about the centre of gravity of the aircraft is a maximum.

The invention can also be applied to aircraft in which, as illustrated in FIGURES 4, 5 and 6, the nozzles are elbow-shaped with a deflection angle less than 90°, and pairs of nozzles are mounted to swivel about rearwardly and downwardly inclined axes symmetrical to the vertical fore-and-aft principal plane and meeting at or near the rotation axis of the engine.

In the sectioned underneath plan view of such an aircraft shown in FIGURE 4, a by-pass type of gas turbine engine 6 supplies compressed air to a forward pair of port and starboard jet thrust nozzles $7_p$ and $7_s$ swivelling about axes 90 which intersect the axis 91 of the engine at 92. As seen in plan view (FIGURE 4) the axes 90 are inclined rearwardly to a transverse plane through the point 92 at an angle 93, and as seen in rear elevation (FIGURE 5) they are inclined downwardly to a horizontal plane through the point 92 at an angle 94. The nozzles deflect the air through an angle less than 90° such that when in their rearward position the mean flow direction has a small outward divergence from the vertical fore-and-aft principal plane passing through the engine axis 92 and the thrust is in the direction of the arrows 95. When the nozzles are in their downward position, the mean flow direction of the air again has a small outward divergence from the principal plane and the thrust is in the direction of the arrows 96. The arrows 95 and 96 intersect the swivel axes 90 at points 97, and the intersection of a line 98 through these points with the principal plane is the centre of rotation $C_f$ of the resultant forward thrust vector, the magnitude of this latter being the sum of the components in fore-and-aft vertical planes of the thrusts of the nozzles $7_p$ and $7_s$. Owing to the symmetry of the arrangement, the resultant forward thrust vector always lies in the vertical fore-and-aft principal plane as the nozzles $7_p$ and $7_s$ are swivelled in unison.

The engine also supplies exhaust gas to a rear pair of port and starboard jet thrust nozzles $8_p$ and $8_s$, the geometry of which is similar to that of the forward pair of nozzles so that the resultant rear thrust vector is the sum of the components in fore-and-aft vertical planes of the thrusts of these nozzles and turns about a centre of rotation $C_r$ in the principal plane.

Owing to the inclination of the swivelling axes 90, and to the gas deflection angle of the nozzles being less than 90°, the thrust vectors of the individual nozzles generate conical surfaces, instead of plane surfaces parallel to the principal plane, and there is some variation in magnitude of the resultant when the magnitudes of the individual vectors remain constant. This is illustrated in FIGURE 6 which is a plan view vector diagram for an arrangement in which the angle 93 is 28.75° (corresponding to a true angle of 25° in a fore-and-aft plane through the swivel axis 90) and the angle 94 is 30°, giving a forward angle of convergence 99 of the horizontal thrust 95 which is 6° and an equal angle of upward convergence of the upward thrust 96. In rotating from the vertical plane position 96 to the horizontal plane position 95, the outer end 100 of the thrust vector travels in an elliptical path 101, which is a projection on a horizontal plane of part of the base of the conical surface swept out by the thrust vector. Over a first part of this path, until point 102 is reached in which the vector lies in a fore-and-aft vertical plane, the component of the vector in the fore-and-aft vertical principal plane (½ FV) is increasing. Thereafter it decreases until the path 101 is at its nearest position to the principal plane, increases again to equality at 103, and finally decreases once more as the horizontal position is approached.

As in the arrangement shown in FIGURES 4 and 5, the geometry of both pairs of nozzles is similar, the front and rear resultant vectors will, so long as they remain parallel to one another, vary in proportion to their initial magnitudes both with change of orientation and change of engine throttle opening.

The description already given in connection with FIGURE 2 applies in the main to the case also, except that allowance must be made for the fact that the front and rear vectors vary in magnitude with change of orientation, so that, for example, maximum front vector nose-up moment is not necessarily produced when that vector is in the position $FV_2$ at right angles to $f_1$. The general principle remains, however, that the rear vector should not be orientated forwards of its initial vertical position before the nose-up moment produced by the front vector has started to decrease.

The use of a pair of front nozzles with less than 90° deflection angle arranged to swivel about rearwardly and downwardly inclined axes positioned so that the thrust vectors are, in the initial position, vertical as seen in side elevation and, as seen in end elevation, move away from the vertical as their resultant vector is turned forwards, is advantageous in arrangements according to the invention since it reduces the increase of nose-up moment which occurs when the front vector is turned forwards.

For similar reasons, it is advantageous that the rear nozzles should either be neutral as regards change of magnitude of the rear resultant vector with initial forward turning from the vertical position (e.g. by using nozzles with 90° deflection angle swivelling about an axis perpendicular to the vertical fore-and-aft principal plane), or that the rear nozzles should be arranged so that, as seen in end elevation, their individual vectors move towards the vertical when their resultant is turned forwards from its initial vertical position.

Figure 3:
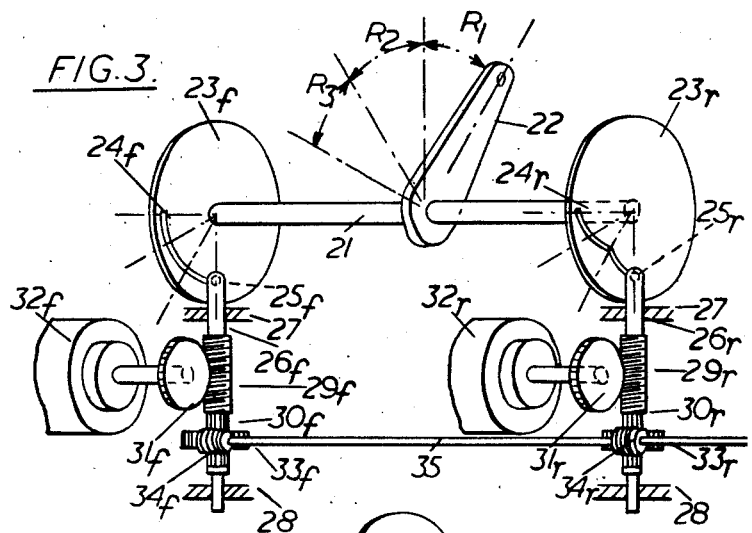
FIGURE 3 shows schematically one form of adjusting means for the jet thrust nozzles.

The device shown schematically in FIGURE 3 for adjusting the nozzles 7 and 8 of the aircraft shown in FIGURE 1 comprises a shaft 21 supported in suitable bearings, not shown, and provided with a lever 22 by which it may be connected to and oscillated by a pilot's control member. The shaft carries a cam disc $23_f$, for the forward nozzle system and a cam disc $23_r$ for the rear nozzle system. Cam slots $24_f$ and $24_r$, formed in the two discs respectively, are engaged by rollers $25_f$ and $25_r$ carried by plungers $26_f$ and $26_r$ supported in bearings 27 and 28. The plungers are provided with rotatable sleeves comprising worm threaded parts $29_f$ and $29_r$ and straight splined parts $30_f$ and $30_r$. The worm threaded parts mesh with wormwheels $31_f$, $31_r$, mounted respectively on the control shaft of a servo motor $32_f$ for orientating the nozzles of the forward nozzle system and the control shaft of a servo motor $32_r$ for the nozzles of the rear system. On the splined parts of the sleeves are mounted wormwheels $33_f$ and $33_r$, respectively meshing with worms $34_f$ and $34_r$ on a shaft 35 connected to a pilot's trim control handwheel, not shown. The whole mechanism connecting the lever 22 to the servo motors $32_f$ and $32_r$ constitutes a "scheduling device".

The lever 22 is shown in its take-off position, in which the rollers $25_f$ and $25_r$ are at positions along the cam slots the radii of which are such that the servo motors $32_f$ and $32_r$ hold the nozzles in positions giving vertically upward front and rear thrust vectors. By rotation of the trim shaft 35, the angular setting of the vectors relatively to the fore-and-aft axis of the aircraft can be adjusted in unison as to obtain a desired attitude of the aircraft during vertical flight.

After the aircraft has gained sufficient height, the lever 22 is moved through a first range $R_1$. The corresponding rotation of the cam disc $23_f$ causes the roller $25_f$ to traverse a part of the cam slot $24_f$ having increasing radius, so that the plunger $26_f$ is depressed and the wormwheel $31_f$ is rotated clockwise. The front vector is thereby turned forwards to the position $FV_2$ shown in FIGURE 2. Simultaneously the corresponding rotation of the cam disc $23_r$ causes the roller $25_r$ to traverse a part of the cam slot $24_r$ having decreasing radius, so that the plunger $26_r$ is raised and the wormwheel $31_f$ is rotated anticlockwise. The rear vector is thereby turned rearwards to the position $RV_2$ shown in FIGURE 2. The lever 22 is then moved through a second range $R_2$, the rollers $25_f$ and $25_r$ traversing parts of the cam slots which increase in radius at equal rates so that the vectors are turned forwards in unison, the front vector finally becoming aligned with the direction of flight 5 and the rear vector passing its vertical position $RV_1$ and finishing at $RV_4$. Movement of the lever 22 through a final range $R_3$ causes the roller $25_f$ to traverse a part of the cam slot $24_f$ which is concentric with the shaft 21 so that no change of orientation of the front vector occurs. The roller $25_r$ however traverses a part of the cam slot $24_r$ which continues to increase in radius, so that the rear vector continues to be turned forwards, reaching the flight direction 5 at the end of range $R_3$.

Figure 3A:
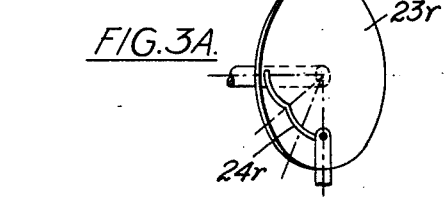
FIGURE 3A illustrates an alternative form.

It will be appreciated that the shape of the cam slots can be adapted to produce the other sequences of operation previously described. For instance, as shown in FIGURE 3A, by having the first and second parts of the cam slot $24_r$ of constant radius, and the third part of increasing radius, the rear vector may be held in the vertical position $RV_1$ until the front vector has reached the position $FV_3$, and both vectors then moved forward together.

Figure 7:
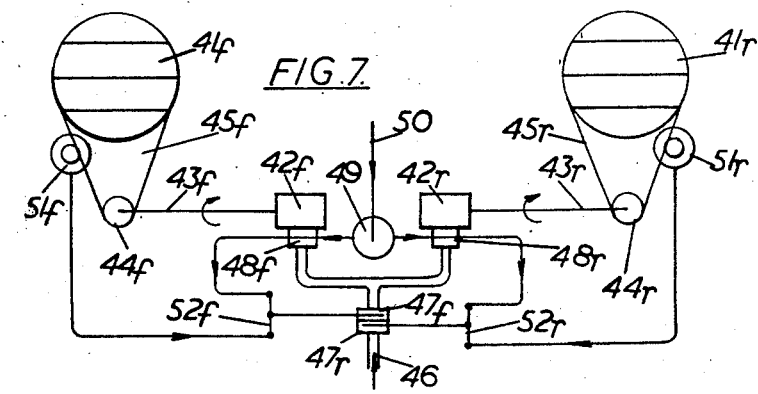
FIGURES 7 and 8 illustrate diagrammatically two further nozzle adjusting systems having an interlock action to prevent departures from the required angular relationship.
Figure 8:
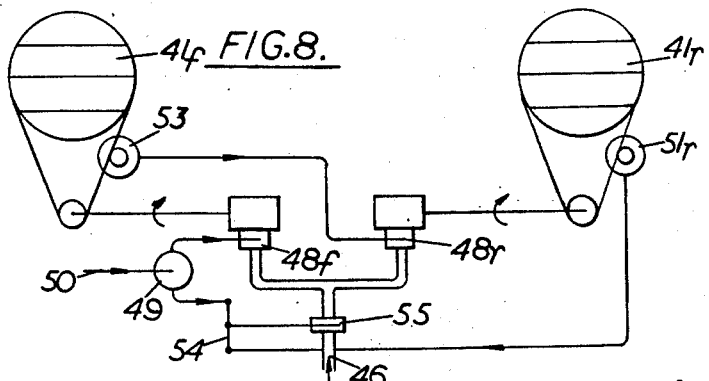

In FIGURE 7, illustrating another form of adjusting system, the forward and rear nozzles are indicated at $41_f$ and $41_r$ respectively, and are rotated by air-driven servo motors $42_f$ and $42_r$ through shafts $43_f$ and $43_r$, sprockets $44_f$ and $44_r$ and chains $45_f$ and $45_r$. Air is supplied to the motors through a pipe 46 containing two shut-off valves $47_f$ and $47_r$, and enters the motors through control valves $48_f$ and $48_r$ operated by a "scheduling" device 49 receiving an input 50 from a pilot's control member. The scheduling device may be a cam system similar to that described in connection with FIGURE 3, but the adaption of other known types will present little difficulty to those skilled in the art. The control valves $48_f$ and $48_r$ include a follow-up system operated by the motor output shafts so that the number of revolutions of the latter from a datum position is proportional to the displacement of the valve, also from a datum position. The pilot's signal to the scheduling device 49 therefore results in the nozzles being moved to the appropriate positions as called for by the operation schedule.

To ensure that a fault in one servo motor, transmission or nozzle bearing will not result in one nozzle being moved without appropriate movement of the other, which might endanger the safety of the aircraft, the nozzles are provided with repeater devices $51_f$ and $51_r$ from which signal are transmitted to comparator devices $52_f$ and $52_r$, represented as differential levers, for comparison with the control valve operating signals transmitted by the scheduling device 49. If the signals become unequal to an extent in excess of a permitted tolerance, the comparator device closes the respective shut-off valve $47_f$ or $47_r$, thereby preventing further movement of either of the nozzles until the fault has been rectified.

This system can only be used in cases in which one of of FIGURE 7 in that the control valve $48_r$ of the rear nozzle servo motor is moved by a second scheduling device 53 operated by the forward nozzle $41_f$, and the rear nozzle angle repeater $51_r$ sends a signal to a comparator 54 receiving its other signal from the first (pilot-operated) scheduling device 49, the comparator acting on a single air shut-off valve 55. With this arrangement, therefore, the rear nozzle position is schedule in response to the forward nozzle position, and failure to follow the schedule results in immobilisation of both nozzles.

The system can only be used in cases in which one of the nozzles moves continuously in the same direction throughout the ranges of movement of the pilot's control. Such a case would, for example, be one in which, during continuous forward turning of FV from vertical to horizontal, RV first moves rearwards and then forwards at a rate such that it arrives at the forward horizontal position at the same time as FV.

The device shown in FIGURES 9, 10 and 11 is suitable for operating the nozzles according to a similar schedule. A pinion 61 on a servo power input shaft 62 drives a gearwheel 63 on a forward nozzle operating shaft 64 through an idler gearwheel 65. Clockwise rotation of this shaft, as seen from the right, turns the forward thrust vector forwards. Also mounted on the shaft 64 is one sun wheel 66 of a differential gear including a second sun wheel 67 on a rear nozzle operating shaft 68 and a planetary system comprising at least one pair of planet pinions 69 and 70 meshing with one another and each with one of the sun wheels, and a planet cage 71 provided with gear teeth 72. Clockwise rotation of the shaft 68 turns the rear thrust vector rearwards.

The planet carrier gear teeth 72 mesh with a gearwheel 73 which is rotated by a cam device 74 to vary the relative angular positions of the nozzle operating shafts 64 and 68. The came device comprises a sleeve 75 having a pair of diametrically opposite cam slots 76 (see the development shown in FIGURE 11), and a gear tooth ring 77 by which it is rotated through intermediate gearwheels 78 and 79 by gear teeth 80 on the shaft 64. A recirculating ball nut 81 lodged within the sleeve 75 operates on a thread 82 formed in a barrel 83 attached to the gearwheel 73. The nut 81 has a pair of diametrically opposite trunnions 84 extending through the cam slots 76 and carrying at their ends rollers 85 running in stationary axially-directed guide tracks 86, so that the nut is constrained to move axially and not rotate. Angular movement of the gear tooth ring 77 causes axial movement of the nut, the relationship between the movements being determined by the shape of the slots 76. This axial movement of the nut produces directly proportionate angular movement of the gearwheel 73.

The device may operate according to various schedules, according to the profile of the cam slots 76, but the following may be taken as representative of its action. Starting from a datum position with the forward and rear thrust vectors vertical, on progressive movement of the pilot's control for transition to horizontal flight the first or main servo motor rotates the shaft 62 clockwise, as seen from the right hand side, so that the forward nozzle operating shaft 64 rotates in the same direction and the forward nozzle system is turned to turn the forward thrust vector forwards and upwards. If the planet carrier 71 were fixed, the rear nozzle operating shaft 68 would rotate in an anticlockwise direction and turn the rear thrust vector forwards at the same rate. A reduced rearward rate is however, required, so a first part of the cam slots 76 is arranged to impart a clockwise rotation to the planet carrier 71 at a rate equal to half the required correction. On reaching the position at which the moment about the aircraft c.g. of the forward thrust vector begins to decrease, it is required to reverse the direction of turning of the rear thrust vector and turn it forwards, in this particular example, at an angular speed about two and a half times that of the forward thrust vector, so that the two reach horizontal forward orientation simultaneously. For this purpose, a second part of the cam grooves 76 is arranged to impart an anticlockwise rotation to the planet carrier 71 equal to half the difference between the required rates of rotation of the shafts 64 and 68.

We claim:

1. In an aircraft, a forward jet thrust nozzle system productive of a resultant thrust vector, a rear jet thrust nozzle system productive of a resultant thrust vector, means adjustably mounting each of said nozzle systems to vary the orientation of its thrust vector in a vertical fore-and-aft principal plane through the centre of gravity of the aircraft, the thrust vector of the forward system turning about an orientation centre forward of and lower than the centre of gravity and the thrust vector of the rear system turning about an orientation centre rearward of and not higher than the centre of gravity: a control member movable from an initial position through a first range and thence through a subsequent range, and a control system linking the control member to the nozzle systems and including: means responsive to the control member being in its initial position to hold the systems with their thrust vectors directed substantially vertically upwards, means responsive to movement of the control member from its initial position through the first range to adjust the front nozzle system to turn its vector forwards until that vector has a maximum moment about the centre of gravity, while preventing the rear system from being adjusted so that its vector is forward of the vertical, and means responsive to movement of the control member through the subsequent range to adjust both systems simultaneously to turn both vectors forwards until the front vector is substantially horizontal.

2. An aircraft according to claim 1 including means responsive to movement of the control member through the first range to turn the rear vector rearwards.

3. An aircraft according to claim 2 including means responsive to movement of the control member through a second range, to turn the front vector forwards to a position at which its moment about the centre of gravity is the same as its moment in the initial position of the control member, and to turn the rear vector forwards to substantially vertical orientation.

4. An aircraft according to claim 1 in which the distances between the centre of gravity and the centres of orientation of the thrust vectors are in inverse ratio to the magnitudes of the thrust vectors, and the means responsive to movement of the control member through the first range are operative to maintain the moments of the vectors about the centre of gravity equal and opposite.

5. An aircraft according to claim 4 in which the means responsive to movement of the control member through the subsequent range are operative to turn the two thrust vectors forwards at equal angular speeds.

6. An aircraft according to claim 5 including means responsive to movement of the control member through a third range to hold the front vector stationary, and to turn the rear vector to a substantially horizontal position.

7. An aircraft according to claim 1 including means responsive to movement of the control member through the first range to hold the rear vector substantially vertical.

8. An aircraft according to claim 1 in which the means responsive to movement of the control member through the subsequent range is operative to turn the thrust vectors at angular speeds such that they attain substantially horizontal orientation simultaneously.

9. An aircraft according to claim 1 is which said control system includes a servo motor to operate the front nozzle system, a servo motor to operate the rear nozzle system, and a scheduling device operative to coordinate the movements of the two servo motors.

References Cited in the file of this patent

UNITED STATES PATENTS

| | | |
|---|---|---|
| 2,870,978 | Griffith et al. | Jan. 27, 1959 |

FOREIGN PATENTS

| | | |
|---|---|---|
| 226,135 | Australia | Dec. 23, 1959 |
| 861,480 | Australia | Feb. 22, 1961 |